(12) United States Patent  
Wilhelmsson et al.

(10) Patent No.: US 9,264,156 B2  
(45) Date of Patent: Feb. 16, 2016

(54) TECHNIQUE FOR CALIBRATING A RECEIVER APPARATUS

(75) Inventors: Leif Wilhelmsson, Dalby (SE); Roland Strandberg, Furulund (SE); Jim Svensson, Bandhagen (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/394,531

(22) PCT Filed: Apr. 20, 2012

(86) PCT No.: PCT/EP2012/001723  
§ 371 (c)(1),  
(2), (4) Date: Oct. 15, 2014

(87) PCT Pub. No.: WO2013/156044  
PCT Pub. Date: Oct. 24, 2013

(65) Prior Publication Data  
US 2015/0071391 A1    Mar. 12, 2015

(51) Int. Cl.  
*H03D 1/04* (2006.01)  
*H04B 17/00* (2015.01)  
(Continued)

(52) U.S. Cl.  
CPC .............. *H04B 17/0062* (2013.01); *H04B 1/10* (2013.01); *H04L 27/3863* (2013.01)

(58) Field of Classification Search  
CPC .. H04B 17/0062; H04B 1/30; H04B 17/0015; H04B 17/0042; H04B 1/005; H04B 1/1027; H04B 1/0057; H04B 1/26; H04B 17/00; H04B 17/008; H04B 17/0085; H04B 1/0028; H04B 1/0039; H04B 1/0032  
USPC ........ 375/346, 316, 349, 260; 455/226.1, 324  
See application file for complete search history.

(56) References Cited

U.S. PATENT DOCUMENTS 6,278,870 B1    8/2001    Davie et al.  
6,330,290 B1    12/2001   Glas  
(Continued)

FOREIGN PATENT DOCUMENTS

EP        0984288 A1    3/2000  
WO     2010000297 A1    1/2010

OTHER PUBLICATIONS

Cherubini, G., et al., "Adaptive Analog Equalization and Received Front-End Control for Multilevel Partial-Response Transmission Over Metallic Cables", IEEE Transactions on Communications, Jun. 1, 1996, pp. 675-685, vol. 44, Issue 6, IEEE Communications Society.

(Continued)

*Primary Examiner* — Rahel Guarino  
(74) *Attorney, Agent, or Firm* — Coats & Bennett, P.L.L.C.

(57) ABSTRACT

A technique for calibrating a receiver apparatus comprising at least one analog signal processing component and an intermediate frequency, or IF, mixer for converting IF signals comprising an in-phase, or I, signal and a quadrature-phase, or Q, signal to baseband frequency signals is provided. The IF mixer is arranged downstream of the at least one analog signal processing component. A method implementation of the technique comprises the steps of determining, in a digital processing domain downstream of the IF mixer, a metric which is affected by a frequency dependency of an imbalance between I and the Q signal, or IQ-imbalance, over a signal bandwidth, generating, based on the metric thus determined, a calibration signal configured to at least partially compensate a frequency-dependency of the IQ imbalance, and feeding the calibration signal to the at least one analog signal processing component so as to calibrate the at least one analog signal processing component.

18 Claims, 8 Drawing Sheets

(51) Int. Cl.
*H04L 27/38* (2006.01)
*H04B 1/10* (2006.01)

(56) References Cited

U.S. PATENT DOCUMENTS

| | | |
|---|---|---|
| 7,035,341 B2 | 4/2006 | Mohindra |
| 7,133,657 B2 | 11/2006 | Kuenen et al. |
| 7,158,586 B2 * | 1/2007 | Husted .......................... 375/324 |
| 2004/0063416 A1 | 4/2004 | Kuenen et al. |

OTHER PUBLICATIONS

Lin, H., et al., "Hybrid Domain Compensation for Analog Impairments in OFDM Systems", IEEE Global Telecommunications Conference, Nov. 30, 2008, pp. 1-5, IEEE.

Gao, J., et al., "Independent Component Analysis Based Semi-Blind I/Q Imbalance Compensation for MIMO OFDM Systems", IEEE Transactions on Wireless Communications, Mar. 1, 2010, pp. 914-920, vol. 9, No. 3, IEEE.

* cited by examiner

(PRIOR ART)

TECHNIQUE FOR CALIBRATING A RECEIVER APPARATUS

TECHNICAL FIELD

The present disclosure relates to communication technologies and particularly to technique for calibrating a receiver apparatus to, among others, effectively compensate an IQ-imbalance. The technique may be implemented in the form of a method, a computer program product or a device.

BACKGROUND

IQ-imbalance, or IQ-mismatch, is a well-known imperfection in receivers used in wireless as well as wired communications. There are several reasons why IQ-imbalance may occur. A common reason for the occurrence of IQ-imbalance in a receiver is when a signal is directly down-converted from radio frequency (RF) to baseband frequency. An arrangement for such down-conversion is referred to as a zero-intermediate frequency receiver or a homodyne receiver. With this kind of arrangement, the RF signal is typically down-converted using a quadrature mixer, i.e., a mixer with two parallel mixing stages, where the RF signal is in the analog domain multiplied by two sinusoids with a 90-degree phase difference (for instance a cosine and a sine) to result in two output signals, respectively.

Due to limitations in the analog implementation of the quadrature mixer, the output is not ideal. Specifically, there is typically a phase error, $\phi$, such that the phase difference between the two output signals will not be exactly 90 degrees but rather $(90+\phi)$ degrees. The phase error $\phi$ might also depend on local oscillator (LO) imperfections. Whatever reason, this is referred to as phase mismatch. Furthermore, the gains of the two mixing stages will not be perfectly matched. This is commonly referred to as gain mismatch.

The resulting IQ-mismatch is often compensated in a feed-forward fashion, that is, any imperfection in the analog components of the receiver is compensated in the digital domain. This approach has shown to be an effective means to allow for relaxed requirements for analog components. However, it comes with a cost of additional digital processing.

Figure 1:
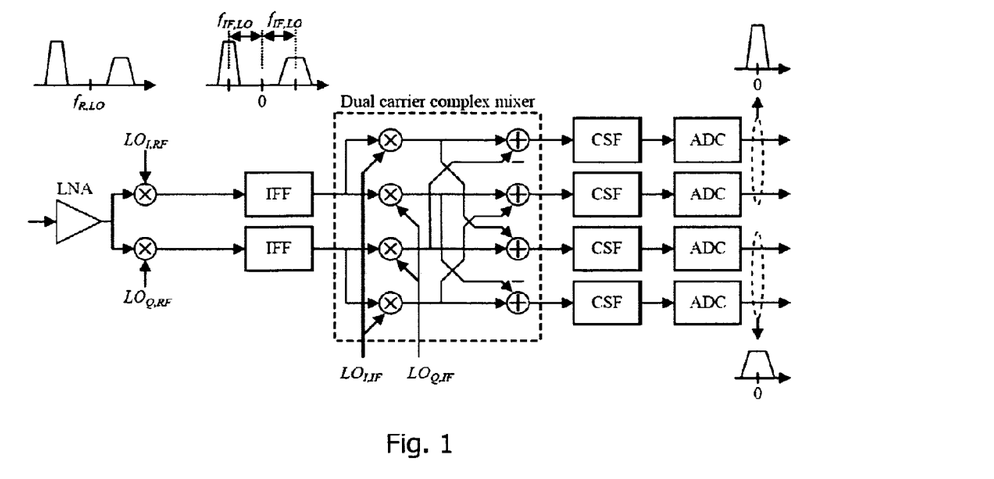
FIG. 1 is a block diagram showing the basic architecture of a receiver apparatus based on a CIF-receiver architecture.

One promising receiver architecture uses an intermediate frequency (IF), rather than a zero-IF, approach. An example of such a receiver architecture is the dual-carrier complex IF (CIF) based receiver as depicted in FIG. 1. In this example, the receiver is designed to process two carriers simultaneously.

As shown in FIG. 1, the received RF signal is first fed to a low-noise amplifier (LNA). The amplification is then followed by a quadrature RF down-conversion mixer where the local oscillator frequency is typically set to approximately halfway between the two carriers such that the two carriers will be placed on the same absolute IF frequency. IF filters (IFF) may be used to filter out these carriers while suppressing interfering signals. A complex IF mixer, such as to the dual carrier complex mixer shown in the middle of FIG. 1, is used to down-convert the two carriers to baseband, after which channel select filtering (CSF) and analog-to-digital conversion (ADC) are performed. Note that the illustration of FIG. 1A is a simplified view of the receiver architecture with the purpose only to exemplify the basic operations.

As explained above, quadrature mixers suffer from gain and phase imbalance between the generated in-phase (I) and quadrature-phase (Q) signals. The performance in this respect is usually measured as image-rejection ratio (IRR). For RF quadrature mixers the IRR is typically in the range of 30-40 dB. In the exemplary architecture described above a finite image rejection in the RF path will cause signal leakage from the lower side carrier into the upper side carrier and vice versa. Gain and phase imbalances will also be introduced by the IF filters and the IF mixer. Typically, the IF mixer has a better IRR than the RF mixer since the IF mixer operates with much lower frequencies.

The IQ-imbalance caused by the RF mixer may be compensated by an adjustable IF mixer. The assumption for this to be valid is that the IQ-imbalance is frequency independent, i.e., the imbalance is the same for the entire bandwidth of the desired signal. For a mixer circuit this assumption can be justified when the bandwidth is sufficiently small compared to the carrier frequency, say, in the order of 1%. It has, however, been found that when the IQ-imbalance is additionally caused by mismatch between other components, such like filters, the resulting IQ-imbalance may no longer be fully frequency independent.

The adjustable IF mixer as mentioned above may only enable the removal of the frequency flat part (i.e., frequency-independent portion) of the IQ-imbalance. When this does not suffice the result can be that the supported data rate has to be reduced. If instead the IQ-imbalance is compensated in the digital domain, higher requirements may be imposed on the ADC, especially when a strong interferer is present at the image frequency. In this case, compensating in the digital domain, if possible at all, may lead to increased power consumption and increased cost because of the higher requirements on the ADC.

SUMMARY

Accordingly, there is a need for a solution to IQ-imbalance compensation for receiver apparatuses, particularly receiver apparatuses employing the CIF mixer architecture. As understood herein, the term receiver apparatus also encompasses a transceiver apparatus that combines receiving and transmission functionalities.

Thus, according to one aspect, a method of calibrating a receiver apparatus comprising at least one analog signal processing component and an intermediate frequency or IF, mixer for converting IF signals comprising an in-phase, or I, signal and a quadrature-phase, or Q, signal to baseband frequency signals, wherein the IF mixer is arranged downstream of the at least one analog signal processing component, is provided. The method comprises the steps of determining, in a digital signal processing domain downstream of the IF mixer, a metric which is affected by a frequency-dependency of an imbalance between the I signal and the Q signal, or IQ-imbalance, over a signal bandwidth, generating, based on the metric thus determined, a calibration signal configured to at least partially compensate the frequency dependency of the IQ-imbalance, and feeding the calibration signal to the at least one analog signal processing component so as to calibrate the at least one analog signal processing component.

The calibration signal may be configured to reduce a frequency dependency of one or both of a gain imbalance and the phase imbalance between the I signal and the Q signal. The frequency dependency may be reduced over the signal bandwidth.

In one implementation, the metric may capture an average performance of the receiver over the signal bandwidth, which means that it does not have to explicitly reflect what the frequency-dependency of the IQ-imbalance looks like. The metric may be affected by a frequency-independent portion of the IQ-imbalance in addition to its frequency-dependent portion.

The calibration signal may in one implementation change (or update) one or more parameters of the analog signal processing component, wherein the parameter change may also change the characteristic (or shape) of the frequency-dependent IQ-imbalance. In other words, one may have a priori knowledge that the parameter change will have an influence on the frequency-dependency of the IQ-imbalance.

As an example, the parameter change may affect a frequency transfer function (or frequency response) of the analog signal processing component. The resulting change of the frequency-dependent IQ-imbalance may then be determined again (e.g., via the metric), and the calibration signal may (e.g., iteratively) be generated such that the frequency dependent part of the IQ-imbalance is at least partially compensated. Accordingly, a compensation of the frequency dependency of the IQ-imbalance can take place without explicitly reflecting the shape of the frequency dependency in the metric that controls the compensation process.

The method may further comprise calibrating the IF mixer so as to at least partially compensate at least one of a gain imbalance and a phase imbalance between the I signal and Q signal. In one implementation a compensation performance of the IF mixer may be determined and the at least one analog signal processing component may selectively be calibrated dependent on the compensation performance. In another implementation, a compensation performance of the at least one analog signal processing component may be determined and the IF mixer may selectively be calibrated dependent on the calibration performance. The selective calibration may in both cases comprise a decision whether or not to perform the corresponding calibration step, or a decision as to the extent (e.g., in terms of a computational complexity) to which the calibration step and its underlying step of generating the compensation signal are performed. The compensation performance may generally be determined in terms of a metric which is related to (e.g., reflects) the IRR.

The calibration signal may be configured to change (or update) one and more parameters of the at least one analog signal processing component. As an example, the parameters may comprise values of passive analog circuit components, including one or more resistors and/or one or more capacitors and/or one or more inductors. In one implementation, the parameter change affects the frequency transfer function of the at least one analog signal processing component. The parameter change may be performed only once or in a temporal pattern (e.g., from one transmission symbol to another or between individual reception time slots of a receiver). Moreover, the method may further comprise determining IF mixer settings for compensating at least one of the gain imbalance and the phase imbalance responsive to the parameter change with respect to the at least one signal processing component.

In one variation, the method may further comprise determining that a compensation performance criterion cannot be met. Such a determination may, for example, be based on a threshold decision with respect to a given desired compensation performance. In case the compensation performance criterion cannot be met, a signal bandwidth reduction may be requested. To this end, a corresponding request signal may be sent (e.g., in the uplink).

The calibration signal may be generated using a calibration algorithm. The calibration algorithm may be based on the metric. The metric may also be used to reflect the compensation performance. Suitable candidates for the metric may be one or both of an estimated signal-to-noise ratio, or SNR (e.g., in an IQ-diagram) and a power of the received signal.

The at least one analog signal processing component may be selected from the set of analog signal processing components comprising one or more radio frequency, or RF, mixers and at least one IF filter. In one implementation, the analog signal processing components comprise a first IF filter for the I signal and a second IF filter for the Q signal. In such an implementation, the calibration signal may be fed to only one of the first IF filter and the second IF filter. For example, the calibration signal may be fed only to the first IF filter. The signal bandwidth may generally be determined by a passband, for example the passband of the at least one IF filter.

With the calibration of the at least one analog signal processing component and/or the IF mixer, the gain and/or phase of the IF signals being converted by the at least one analog signal processing component and/or the IF mixer can be adjusted. The calibration may further comprise a step of decreasing, or limiting, the bandwidth of the IF signals being converted by the at least one analog signal processing component and/or the IF mixer.

According to another aspect, a computer program product is provided as a calibration technique. The computer program product comprises program code portions for performing the steps of the calibration method presented herein, when the computer program product is run on a computing device. Further, the computer program product may be stored on a computer-readable recording medium.

Also provided is a device for calibrating a receiver apparatus, wherein the receiver apparatus comprises at least one analog signal processing component and an intermediate frequency, or IF, mixer, for converting IF signals comprising an in-phase, or I, and a quadrature-phase, or Q, signal to baseband frequency signals, wherein the IF mixer is arranged downstream of the at least one analog signal processing component. The device comprises a component configured to determine, in a digital signal processing domain downstream of the IF filter, a metric which is affected by a frequency-dependency of an imbalance between the I and the Q signal, or IQ imbalance, over a signal bandwidth, a generator configured to generate, based on the metric thus determined, a calibration signal configured to at least partially compensate the frequency dependency of the IQ-imbalance, and a feeder configured to feed the calibration signal to the at least one analog signal processing component so as to calibrate the at least one analog signal processing component.

The device may be part of the receiver apparatus. The receiver apparatus may be configured as a transceiver and may be implemented in a mobile terminal such as a mobile telephone or smartphone or in a stationary terminal. The receiver may comprise the one or more analog signal processing components, such as one or more RF mixers and/or one or more IF filters.

BRIEF DESCRIPTION OF THE DRAWINGS

In the following, the technique presented herein will be described with reference to the drawings, wherein.

DETAILED DESCRIPTION

In the following description, for purposes of explanation and not limitation, specific details are set forth, such as particular sequences of steps, layout of various components of the receiver, and particular kinds of the analog components in the receiver, in order to provide a thorough understanding of the technique presented herein. It will be apparent to those skilled in the art that the receiver and related methods may be implemented in other embodiments that depart from these specific details.

Moreover, those skilled in the art will appreciate that the functions explained herein may be, completely or in part, implemented using software functioning in conjunction with a programmed microprocessor or general purpose computer. It will also be appreciated that while the techniques are primarily described in the form of methods, the technique may also be embedded at least partially in a computer program product as well as in a system comprising a computer processor and a memory coupled to the processor, wherein the memory is encoded with one or more programs that may perform the function disclosed herein.

In the following disclosure, solutions are provided to calibrate one or more of the analog components of a receiver apparatuses in order to, among others, at least partially compensate for the IQ-imbalance introduced by various imperfections and in this way avoid, or at least reduce, the need for compensation in the digital baseband. In addition or as an alternative to calibrating the IF mixer which will mainly allow for compensating for a frequency-independent portion of the IQ-imbalance, one of more analog components may be calibrated in order to allow for compensation of frequency dependent IQ-imbalance.

FIG. 1 shows an exemplary receiver based on the CIF-mixer architecture suitable for implementing the technique presented herein. More specifically, the receiver comprises a CIF mixer and at least one analog signal processing component upstream thereof. (For example, the intermediate frequency filter, IFF, and the radio frequency, RF, mixer shown in FIG. 1 are such analog components.) The CIF mixer and the other analog signal processing components of the receiver are adapted to convert intermediate frequency signals received by the receiver to baseband frequency signals. The received intermediate frequency signals may comprise a first phase signal, such as an in-phase, I, signal and a second phase signal, such as a quadrature-phase, Q, signal. As described above, there is usually imbalance between the I signal and the Q signal during the conversion.

IQ-imbalance can be seen as comprising at least two portions: one portion which is common to all frequencies of interest, i.e., a frequency-independent portion; and the other portion which is different for different frequencies within the signal bandwidth, i.e., a frequency-dependent portion, or frequency-selective portion. The common portion is typically the dominating part and often it suffices to compensate for this portion in order to obtain a desired compensation. However, as the bandwidth of the desired signal is increased, for example in communications where higher data rates need to be supported, it is also important to compensate for the frequency selective portion over the signal bandwidth.

The technique described in this disclosure is applicable to a receiver architecture working with one or more intermediate frequencies, for instance a complex IF (CIF) architecture as illustrated in FIG. 1. The technique is not only capable of calibrating the IF mixer of the receiver, but also one or more of the other components of the receiver, which allow for frequency dependent compensation. Different components, for instance, one or more analog signal processing components of the receiver, can be chosen for this purpose. For instance, one or more IF filters may be chosen.

Figure 2:
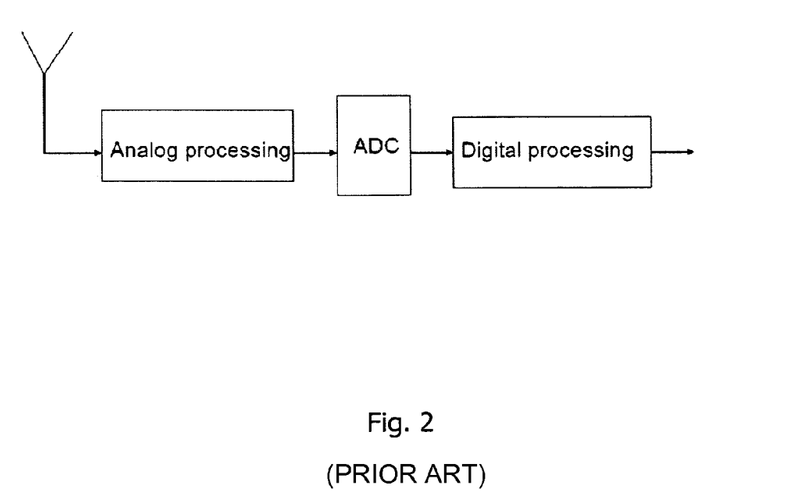
FIG. 2 is a diagram showing a conventional IQ-imbalance compensation technique where the compensation is dealt with only in the digital domain of the receiver apparatus.

Much of the prior art related to dealing with IQ-imbalance is through compensation in the digital baseband of the receiver. On a schematic level, this is illustrated in FIG. 2, where it is indicated that no attempt is made to adjust any analog component of the receiver. Although the signal which enters the analog-to-digital converter (ADC) might be severely impacted by IQ-imbalance, this will be compensated in the digital baseband in a feed-forward fashion. As such, generally only the frequency-independent portion of the IQ-imbalance can be compensated.

On the other hand, in some techniques of the present disclosure one or more components in the analog part of the receiver are calibrated based on feedback from the digital part so as to (additionally). This is illustrated in FIG. 3A.

Figure 3A:
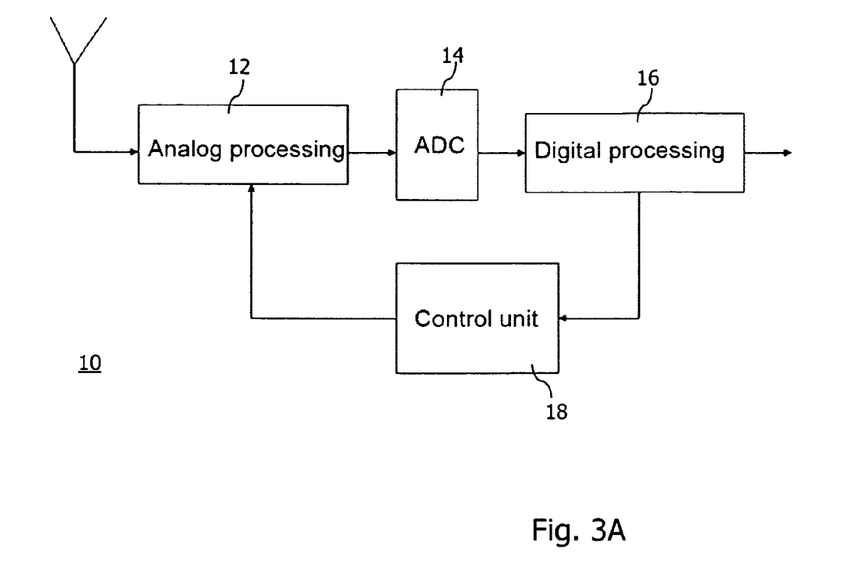
FIG. 3A is a block diagram showing an embodiment of a receiver apparatus where certain analog signal processing components of the receiver are calibrated based on feedback from the digital domain.

FIG. 3A shows an embodiment of a receiver apparatus 10 that is configured to be calibrated as will be described in more detail below. In brief, the receiver apparatus 10 comprises an analog processing domain 12 with one or more analog signal processing components, an ADC 14 arranged downstream of the analog processing domain 12, and a digital processing domain arranged downstream of the ADC 14. A device in the form of a control unit 18 is provided in a feedback loop for calibration of the receiver apparatus 10.

Figure 3B:
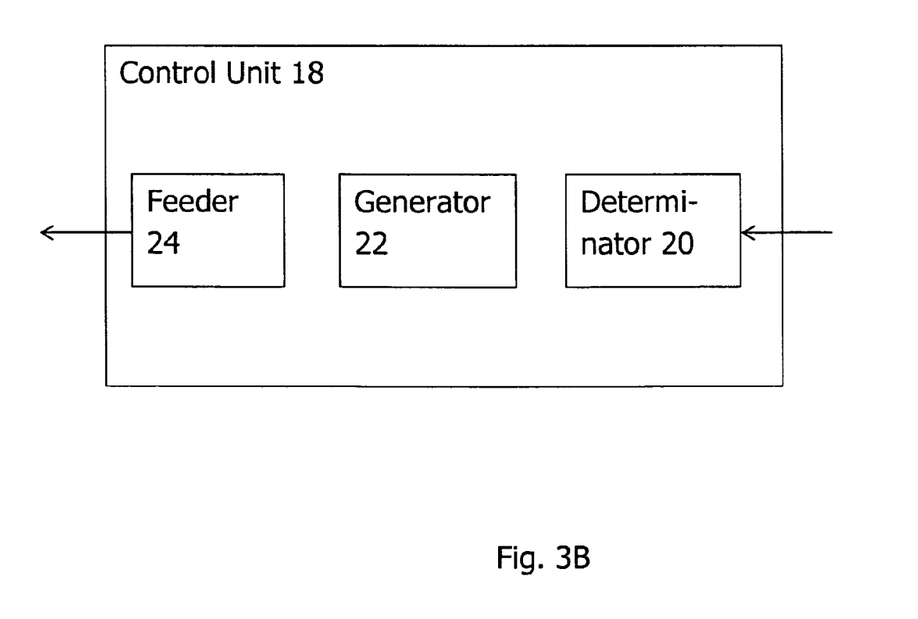
FIG. 3B is a block diagram of a device embodiment.

As illustrated in FIG. 3B, the control unit 18 comprises a determinator 20 coupled to the digital processing domain 16, a generator 22 coupled to the determinator 20, and a feeder 24 coupled between the analog processing domain 12 on the one hand and the generator 22 on the other. The determinator 20 is configured to determine, in the digital processing domain 16 downstream of an IF mixer comprised by the analog processing domain 12, a metric affected by a frequency-dependency of an imbalance between an I signal and Q signal over a signal bandwidth of a received signal processed in the analog processing domain 12. The generator 22 is configured to generate, based on the metric thus determined, a calibration signal configured to at least partially compensate the frequency dependency of the IQ-imbalance. The feeder 24 is configured to feed the calibration signal generated by the generator 22 to at least one analog signal processing component of the analog processing domain 12 so as to calibrate the at least one analog signal processing component.

Figure 3C:
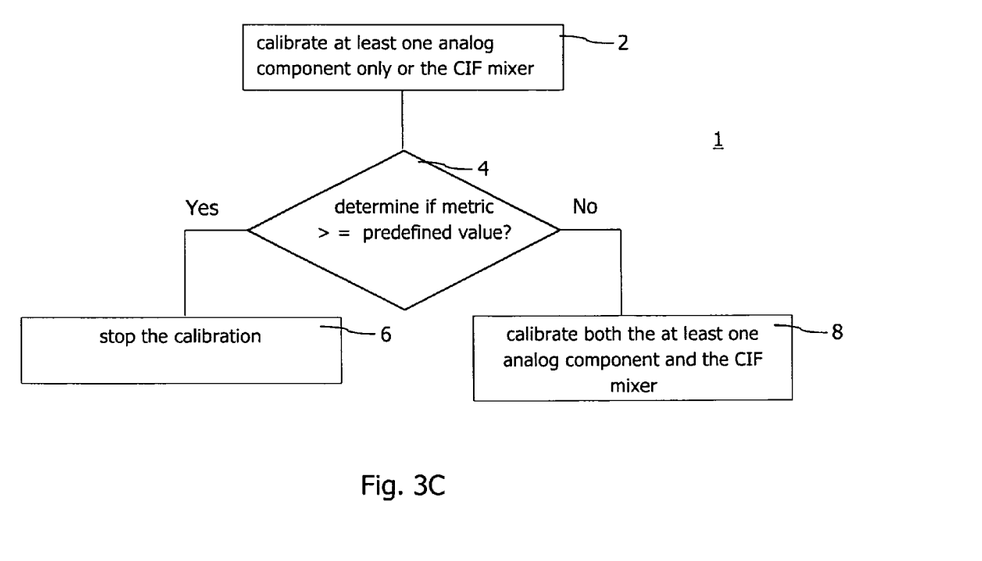
FIG. 3C is a flow diagram showing a method embodiment of calibrating a receiver based on the CIF-mixer architecture.

As shown in FIG. 3C, a method embodiment may be applied by the receiver control unit 18 to calibrate the receiver apparatus 10 in order to, among others, compensate the IQ-imbalance Specifically, the method, denoted as 1, may comprise the following steps: at step 2, the method calibrates at least one analog signal processing component different from a CIF mixer only or the CIF mixer only, to reduce at least a portion of the IQ-imbalance. At step 4, it is determined whether the determined metric is equal to or above a predefined value. Next, as shown at step 6, if the metric determined is equal to or above the predefined value, the calibration is stopped; or, as shown at step 8, if the metric determined is lower than the predefined value, the method continues with the calibration by calibrating both the at least one analog component and the CIF mixer, to further reduce one or more portions of the IQ-imbalance. Calibrating the at least one analog component may serve to reduce at least a frequency-dependent portion of the IQ-imbalance present in the receiver apparatus 10, whereas calibrating the CIF mixer may serve to reduce at least a frequency-independent portion of the IQ-imbalance. More specifically, the calibration involves adjusting various parameters of the analog signal processing component and/or the CIF mixer so that a gain and/or a phase of the IF signals under conversion by the analog signal processing component and/or the CIF mixer are adjusted.

Figure 4:
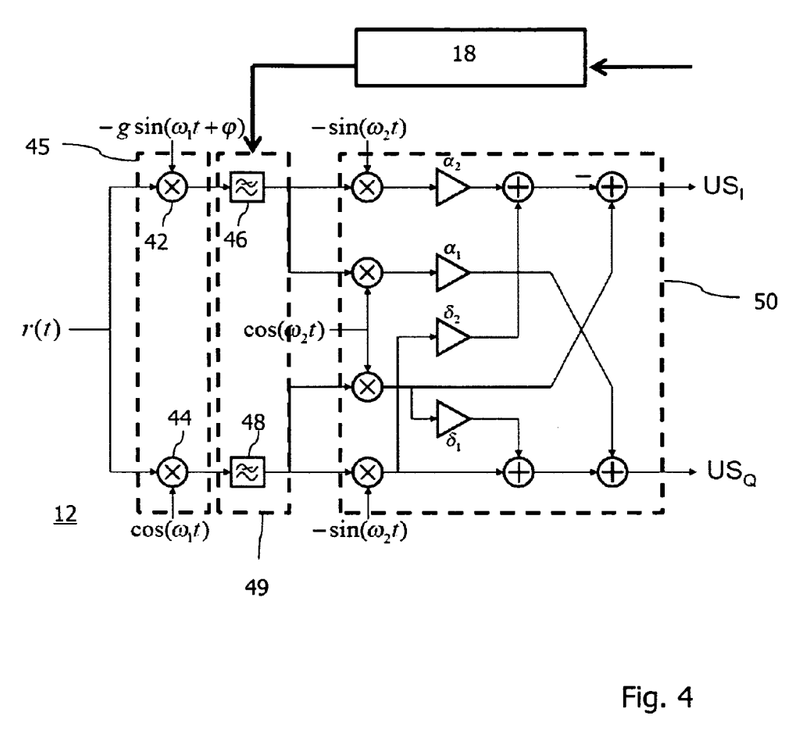
FIG. 4 is a block diagram showing an embodiment of a portion of a receiver apparatus.

FIG. 4 shows an embodiment of a portion of the analog processing domain 12 in FIG. 3A that comprises one or more analog signal processing components. As shown in FIG. 4, first, the received signal r(t) is down-converted by two parallel mixers 42, 44 of an RF mixer stage 45 to derive both in- and quadrature-phase signal components at IF frequency. After passing through associated IF filters 46, 48 of an IF filter stage 49, the filtered IF signals are down-converted to baseband by a CIF mixer 50 (or any other IF mixer). With reference to FIG. 1, the carriers located at the upper and lower sidebands are then obtained depending on how the summation is performed.

Returning to FIG. 4, this illustrates the situation where the upper sideband is the desired carrier. The imbalance among the mixers 42, 44 of the RF mixer stage 45 is modelled as a gain and phase imbalance in the quadrature branch, but how the imperfection is modelled is of no relevance for the compensation technique described herein. Furthermore, to compensate for the IQ-imbalance in the RF mixer 45, the CIF mixer 50 includes the possibility to effectively adjust the gain (e.g., using the parameters $\alpha_1$ and $\alpha_2$), and the phase (e.g., using the parameters $\delta_1$ and $\delta_2$).

Although there will be IQ-imbalance originating from both the RF mixer stage 45 and the CIF mixer 50, it is often the case that for a CIF architecture the RF mixer stage 45 typically is an important source of IQ-imbalance. The reason is that a mismatch in the delay between the in- and the quadrature-phase paths will enlarge as the frequency increases, since the phase mismatch is proportional to the frequency.

The IQ-imbalance caused by the RF mixer stage 45 may be compensated by an adjustable CIF mixer 50 using four parameters. As shown in FIG. 4, $US_I$ and $US_Q$ denote the in- and quadrature-phase components of the upper sideband (US), respectively. Depending on the mismatch in the RF mixer stage 45 and the settings in the CIF mixer 50, $US_I$ and $US_Q$ will include different undesired signal components in addition to the desired ones. Of concern is the undesired signal component, which is due to the signal at the image frequency. Because of the interest in the upper sideband (US), these components are those corresponding to the lower sideband (LS), i.e., the components at the lower frequencies.

$US_I$ and $US_Q$ may be expressed as $$US_I = \frac{1 + g\alpha_2\cos(\varphi)}{2}\cos(\omega_1 + \omega_2)t + \frac{\delta_2 - \alpha_2 g\sin(\varphi)}{2}\sin(\omega_1 + \omega_2)t +$$

-continued $$US_Q = \frac{1 - g\alpha_2\cos(\varphi)}{2}\cos(\omega_1 - \omega_2)t - \frac{\delta_2 - \alpha_2 g\sin(\varphi)}{2}\sin(\omega_1 - \omega_2)t$$
$$+ \frac{\alpha_1 g\sin(\varphi) - \delta_1}{2}\cos(\omega_1 + \omega_2)t - \frac{1 + \alpha_1 g\cos(\varphi_1)}{2}\sin(\omega_1 + \omega_2)t -$$
$$\frac{\alpha_1 g\sin(\varphi) - \delta_1}{2}\cos(\omega_1 - \omega_2)t + \frac{1 - \alpha_1 g\cos(\varphi_1)}{2}\sin(\omega_1 - \omega_2)t$$

In case the IQ-imbalance is frequency independent, the image components can be cancelled by choosing $$\alpha_1 = \alpha_2 = \frac{1}{g\cos(\varphi)}$$

and $$\delta_1 = \delta_2 = \tan(\varphi).$$

However, in case the IQ-mismatch is frequency dependent as in the present case, perfect cancellation may not be possible for all frequencies of the desired signal. It can be shown that a suitable choice of the parameters in the CIF mixer 50 can be found by minimizing the power of the (frequency dependent) leakage over the bandwidth of the signal, i.e., by minimizing the terms at frequency $(\overline{\omega}_1 - \overline{w}_2)$. As can be seen there are in total four such terms, two for $US_I$ and two for $US_Q$. Specifically, the expression to be minimized is $$\int_{BW} \left(\frac{1 - g(f)\alpha_2\cos(\varphi(f))}{2}\right)^2 + \left(\frac{\delta_2 - \alpha_2 g(f)\sin(\varphi(f))}{2}\right)^2 +$$
$$\left(\frac{\alpha_1 g(f)\sin(\varphi(f)) - \delta_1}{2}\right)^2 + \left(\frac{1 - \alpha_1 g(f)\cos(\varphi(f))}{2}\right)^2 df$$

It can be shown that the expression above can be minimized by removing the average IQ-imbalance over the bandwidth of the signal, which henceforth is referred to as the frequency independent portion of the IQ-imbalance. Whether this frequency independent imbalance is due to the RF mixer stage 45 or the IF filters 46, 48 is basically irrelevant. Thus, the IF mixer 50 will simply remove the frequency independent portion of the IQ-imbalance such that only the frequency dependent component remains.

Figure 5A:
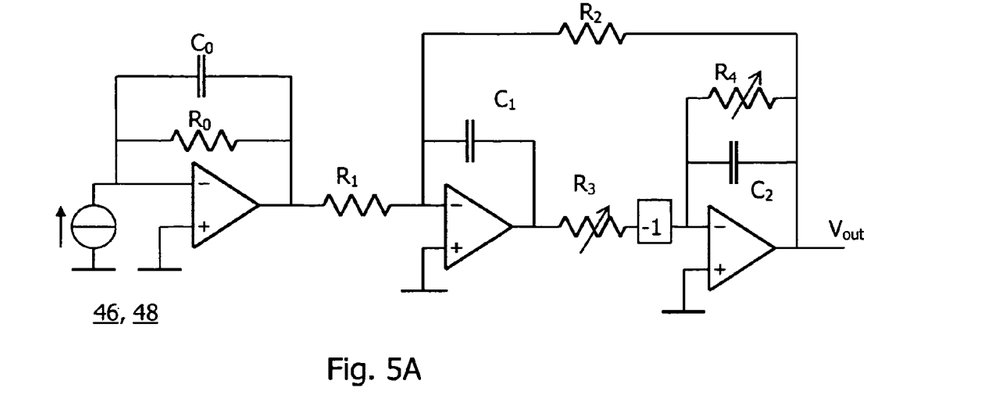
FIGS. 5A, B are block diagrams showing embodiments of an intermediate frequency filter (IFF) and of a resistor thereof.

To appreciate how severe IQ-imbalance may be, simulations have been performed with an embodiment of an IF filter 46, 48 as illustrated in FIG. 5A. The filter 46, 48 of FIG. 5A is realized as a third order Chebyshev low-pass filter with multiple resistors and capacitors. The resistor values are generally selected by gain and noise requirements. The capacitor values are used to set the bandwidth of the filter in the present design. The bandwidth of the filter 46, 48 may have a reconfigurable bandwidth of, for example, 4.75 to 34.75 MHz. By controlling the passive circuit elements of the filter 46, 48, the frequency dependent IQ-imbalance (and bandwidth spread) can be corrected, resulting in a remaining frequency flat IQ-balance as will be discussed in more detail below.

Two filters 46, 48 are generated, one for the in-phase branch and one for the quadrature-phase branch as shown in FIG. 4. The two filters 46, 48 may be realizations of the same nominal filter, but where the standard deviation of the resistors and capacitors are assumed to be 1% and 0.5%, respectively. The frequency dependent gain, $g_m$, and phase, $\phi$, imbalance of the two filters 46, 48 can then be defined as follows:

$$g(f) = \left|\frac{H_I(f)}{H_Q(f)}\right|; g_m(f) = g(f) - 1$$

$$\varphi(f) = \arg(H_I(f)) - \arg(H_Q(f))$$

The frequency range of interest is defined by the frequencies of the desired signal, i.e., the passband of the signal, which in the figures used henceforth will be from about 10 MHz to about 30 MHz. The performance with respect to IQ-imbalance is then often measured by the image rejection ratio (IRR), which may be defined as $$IRR(f) = \frac{4}{g_m^2(f) + \varphi^2(f)}$$

and finally the effective, or average, IRR may be obtained as $$IRR = \frac{4}{\int g_m^2(f) + \varphi^2(f) df}$$

where the integration, as above, is performed over the passband of the signal.

Figure 6:
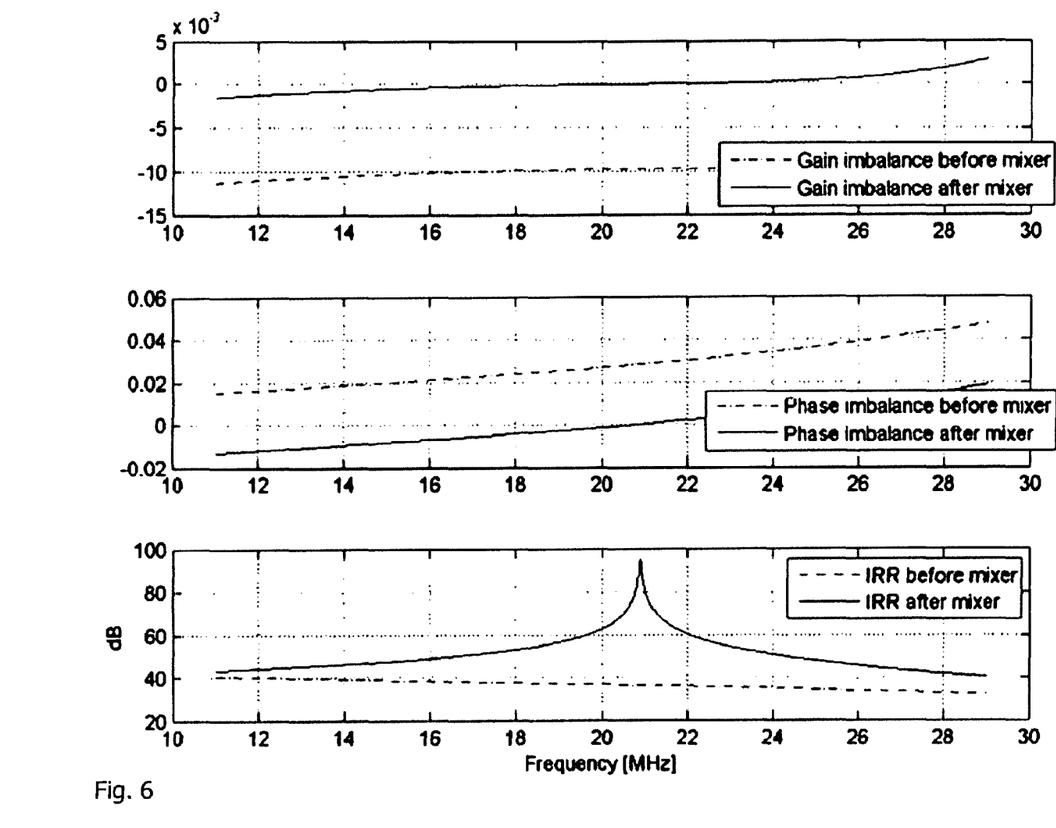
FIG. 6 is a performance diagram showing the effect of the IQ-imbalance compensation technique wherein only the IF mixer is calibrated.

In the upper and middle parts of FIG. 6, the gain imbalance and phase imbalance for the filter without any compensation is shown, while the solid lines indicate such imbalance for the filter with compensation. Here the compensation implies, among others, that the average gain error and phase error over the bandwidth of interest are removed or at least reduced. In practice, this may be accomplished by calibrating or tuning the CIF mixer 50. In addition, the frequency dependent IRR is shown in the lower part of FIG. 6. As shown, in case of no compensation, the effective IRR is 37 dB, whereas in case of compensation it is increased to 51 dB.

To further improve the IRR, it may be beneficial to also calibrate one or both of the filters 46, 48 or other analog signal processing components of which the frequency transfer function can be tuned. When calibrating an individual one of the filters 46, 48, the IRR of the calibrated filter 46, 48 may not be of major importance. More important is that the gain and phase imbalance between the two filters 46, 48 becomes as frequency independent as possible such that it can be effectively compensated by the CIF mixer 50 (see FIG. 4).

In general, calibration of the frequency selective IQ-imbalance may be achieved by adjusting at least one of the signal processing components in the analog part of the receiver. That is, adjustment of the filters 46, 48 is just one example, and other components could be adjusted in addition or as an alternative. By adjusting at least one of the signal processing analog components, the IQ-imbalance is made more frequency independent, and therefore the CIF mixer 50, which can remove frequency independent IQ-imbalance, becomes more efficient.

Figure 5B:
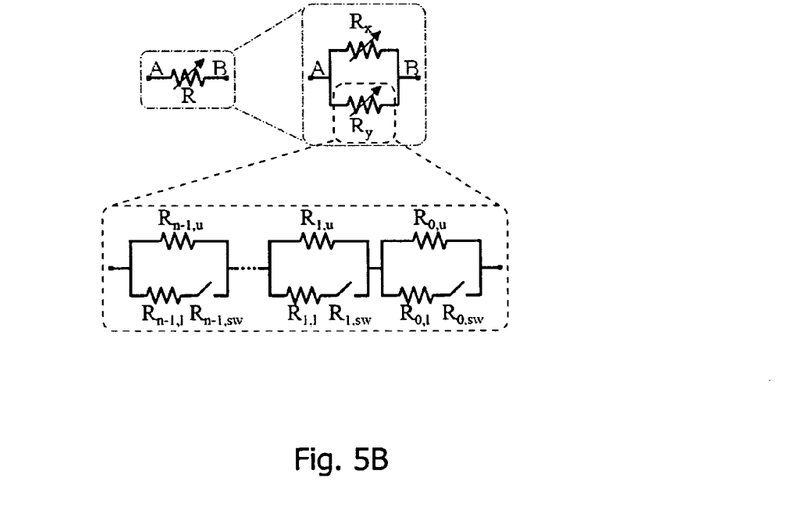

In the embodiment illustrated in FIG. 5A, parameters (i.e., resistance values) of resistors R3 and R4 may be affected by the feedback signal generated by the control unit 18. Accordingly, both R3 and R4 may be configured as variable resistors as generally illustrated in FIG. 5B. FIG. 5B shows a digitally configurable resistor circuit that may be used to realize R3 and R4.

By changing the parameters of R3 and R4 responsive to the feedback signal, the frequency transfer function of the associated filter 46, 48 is changed, which in turn influences the frequency dependency of the IQ-imbalance (assuming that the frequency transfer function of the second filter is not changed in the same manner). R3 mainly influences the filter bandwidth, and R4 the peaking. Statistical analyses have shown that tuning of R3 and R4 is sufficient to reach a desired IRR level.

In principle, the feedback signal may affect additional or alternative passive circuit elements of the filter 46, 48 illustrated in FIG. 5A as long as the resulting parameter change has an influence on the frequency transfer function. As an example, the parameters of one or more of C1 and C2 may be changed in addition to, or instead of, the parameters of R3 and R4. By tuning more filter components, a better IRR level can be achieved, at the cost of an increased complexity of the control unit 18.

Figure 7:
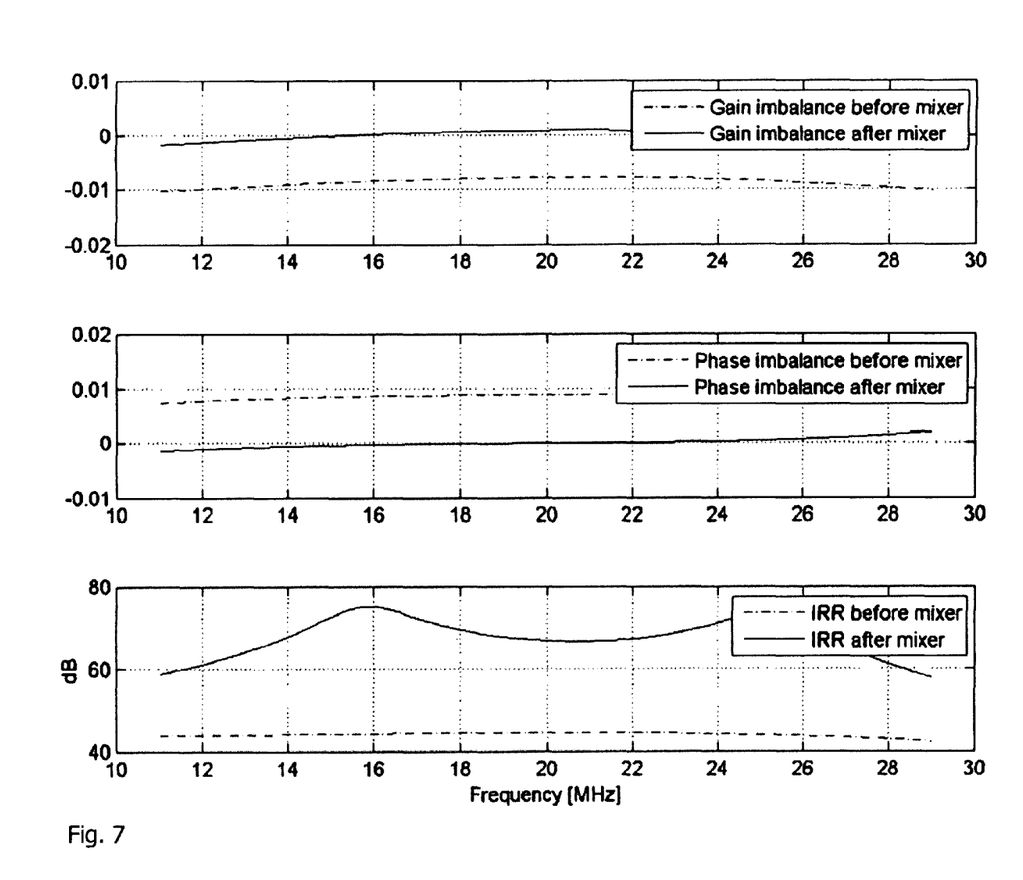
FIG. 7 is another performance diagram showing the effect of the IQ-imbalance compensation technique wherein both the IF mixer and at least one analog component of the receiver are calibrated.

In FIG. 7, the gain and phase imbalance, together with the frequency dependent IRR, are shown when one of the filters 46, 48 is additionally calibrated according to the technique presented herein. Again, the performance is shown with and without compensation in the CIF mixer 50 to illustrate that the performance will be improved if at least one of the filters 46, 48 is additionally calibrated. However, only adjusting the one or both of the filters 46, 48 may not suffice. As can be seen, the gain and phase imbalance are both made more frequency independent by the filter calibration, and this remaining imbalance may be removed by the CIF mixer 50. In this example, the effective IRR is 68 dB. In this case, the IRR of the adjusted filter 46, 48 without compensation in the CIF mixer 50 is 44 dB.

When calibrating the IF filter stage of FIG. 4 using a suitable calibration signal generated by the control unit 18 of FIGS. 3A and 3B, either both IF filters 46, 48 or only one of them may be calibrated. For the performance figures presented herein, only one of the filters 46, 48 is calibrated, namely the IF filter 46 in the in-phase branch.

Figure 8:
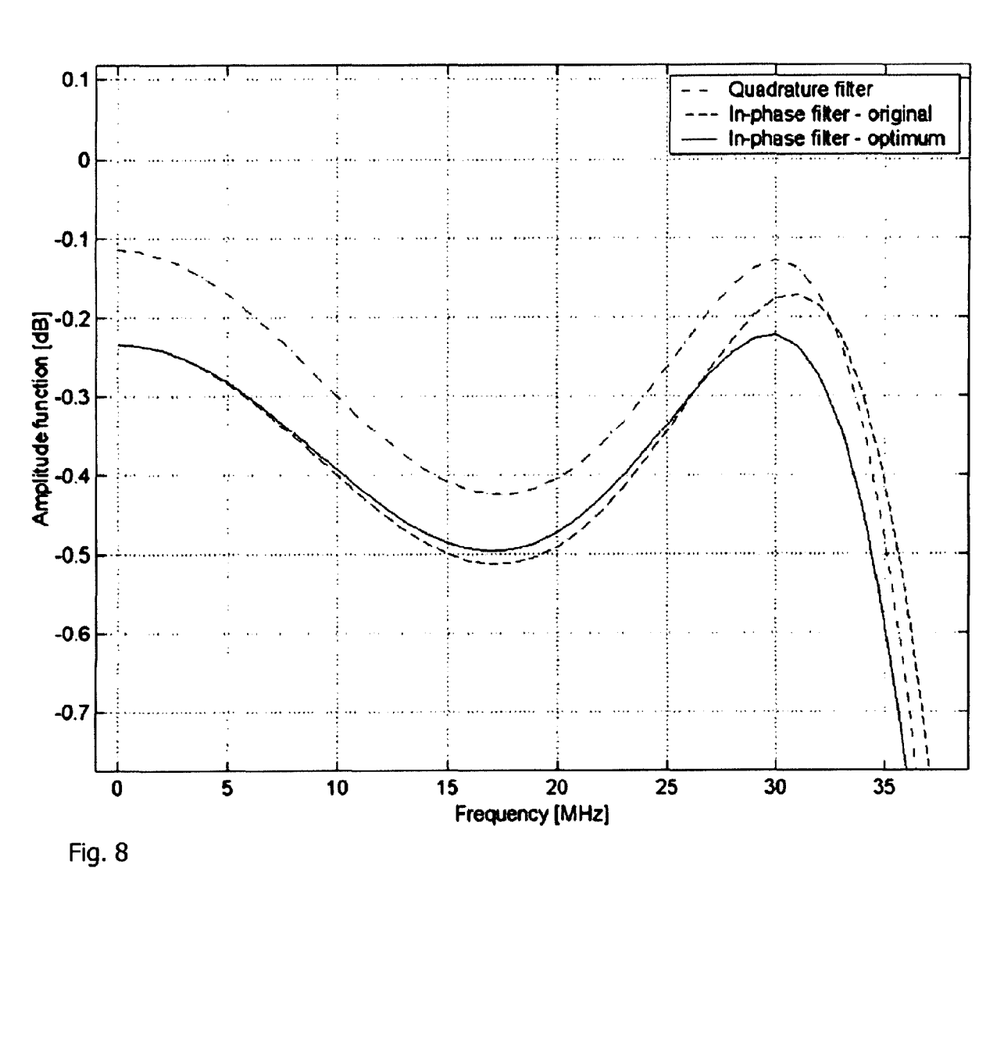
FIG. 8 is a performance diagram showing an IQ-imbalance compensation technique where one or more IF filters are calibrated.

In FIG. 8, the amplitude function for the IF filter 48 in the quadrature branch is compared to the original IF filter 46 in the in-phase branch (i.e., before calibration) and the optimum IF filter 46 in the in-phase branch (i.e., the best possible filter given that only the two components R3 and R4 as indicated in FIG. 5A can or will be calibrated).

Based on the observation that the spectral shape of the gain and phase imbalance can change significantly when some of the components of the receiver are adjusted, a technique to ensure that the global optimum can be found by a calibration algorithm may use the approach described hereinafter. Each time the parameters in the IF filter stage 49 are updated, the optimum mixer settings (see mixer parameters illustrated in FIG. 4) are determined. In this way it can be determined that in fact the IQ-imbalance has become less frequency selective, which is exactly the purpose of calibrating of the different components.

In the simulations above, the IRR is determined using knowledge of the spectral gain and phase imbalance. The IRR is in the present embodiment the target that is to be optimized, but the IRR may be difficult to estimate in certain scenarios. Therefore, when an algorithm for calibrating the IQ imbalance is implemented by the generator 22 of FIG. 3B, metric information not providing the exact IRR but rather reflecting same (e.g., in a sense that, for instance, an improvement in the metric corresponds to an improvement of the IRR) may be used in order to determine how to update the IF filter stage 49 as well as the CIF mixer 50 (i.e., how to change the associated parameters of those analog signal processing components).

The metric generally depends on the (average) IQ-imbalance over the bandwidth. In the present embodiment, the metric is effected by both the frequency-dependent and the frequency-independent portion of the IQ-imbalance.

The metric used for calibrating the IF filter stage 49 and the CIF mixer 50 may be an estimated SNR in the IQ-diagram. In another version, the metric may be taken from the time domain, i.e., before applying the FFT. In this case the metric may be the power of the received signal. The power of the received signal may often be approximated as the sum of the desired signal and the leakage component, which are independent. Because the power of the desired signal is only marginally affected by changing the gain and phase imbalance, the minimum power is obtained by minimizing the leakage component.

It should be noted that the technique presented herein is not limited to any specific metric, but it may in general reflect the IRR of the receiver. Moreover, the metrics mentioned above assume that the received desired signal is present, but it might also be feasible to find a metric that can be used for compensation purposes also when the desired signal is not present (or its impact can be neglected compared to the signal at the image frequency). An example is when the receiver is also able to generate a test signal at the image frequency which then can be used for calibration. In this case the calibration metric would typically be related to the signal strength which is found at the frequency of the desired signal. The test signal at the image frequency can either be sent when there is no signal present at the frequency of the desired signal or, since the test signal can easily be made much stronger than the received desired signal, with the desires signal present.

When running an algorithm for IQ-imbalance compensation in the generator 22, calculations may sometimes become more complex if frequency dependent IQ-imbalance has to be compensated compared to the case where it suffices to only compensate the frequency independent portion. Although calibration of the frequency dependent portion might increase the IRR by 10 dB or more, it might not be needed in every case.

In another implementation, the fact that it sometimes suffices to only calibrate the frequency dependent portion of the IQ-imbalance is exploited. In this implementation firstly, a calibration is done where only the IF mixer 50 is calibrated. If the resulting IRR is determined to be sufficiently high no further calibration is performed. On the other hand, if the IRR is determined to be not high enough calibrating the frequency dependent IQ-imbalance is additionally performed.

The required IRR depends on a number of factors. Importantly, it depends on what SNR is needed for the desired signal and the relative strength of the desired signal and the signal at the image frequency. If a high SNR is required, better IRR is needed. Similarly, for a required SNR, if the signal at the image frequency is increased while the desired signal power is kept the same, the IRR needs to be improved. Thus, the need for frequency dependent IQ-imbalance calibration does not only depend on the receiver as such but also on the actual operating conditions as described above.

In the present example, the achieved IRR is about 51 dB and 68 dB for frequency independent calibration and frequency independent and dependent calibration, respectively. In this particular example, the used bandwidth of the signal is about 20 MHz. If the bandwidth of the signal is decreased, the IQ-imbalance will be less frequency dependent and vice versa. In some communication systems, where bandwidth of 100 MHz may be supported, it is important to compensate for the frequency-dependent IQ-mismatch.

In yet another implementation the above fact is exploited. Specifically, when performing calibration of the IQ-imbalance the bandwidth of the desired signal is also taken into consideration. An example of how the obtainable IRR for a specific receiver might depend on the used bandwidth and the type of calibration used is given in Table 1. In case there is a strong signal on the image frequency so that a 60 dB IRR is needed, the receiver can in this case request (e.g., via dedicated signalling) that the used bandwidth should not exceed 20 MHz. Alternatively, if the receiver for some reason does not perform frequency dependent IQ-imbalance calibration, it may request (e.g., via dedicated signalling) that the used bandwidth should not exceed 10 MHz. If then at a later time there would be no signal at the image frequency, the receiver might allow bandwidth up to 100 MHz to be used (e.g., via dedicated signalling).

TABLE 1

Illustration of how obtainable IRR may vary with bandwidth and type of calibration used

| Used Bandwidth | IRR (mixer only) | IRR (mixer + filter) |
|---|---|---|
| 10 MHz | 60 dB | 70 dB |
| 20 MHz | 53 dB | 63 dB |
| 40 MHz | 40 dB | 50 dB |
| 100 MHz | 30 dB | 40 dB |

As has become apparent from the above description of exemplary embodiments, the technique presented herein permits to substantially suppress IQ-imbalance in terms of one or both of gain and phase in a receiver apparatus. In certain implementations, frequency-dependent and frequency-independent portions of the IQ-imbalance may be tackled individually or jointly.

While the technique presented herein has been described with respect to particular embodiments, those skilled in the art will recognize that the present invention is not limited to the specific embodiments described herein. It is to be understood that this disclosure is only illustrative. Accordingly, it is intended that the present invention be limited only by the scope of the claims appended hereto.

The invention claimed is:

1. A method of calibrating a receiver apparatus comprising at least one analog signal processing component and an intermediate frequency (IF) mixer for converting IF signals comprising an in-phase (I) signal and a quadrature-phase (Q) signal to baseband frequency signals, wherein the IF mixer is arranged downstream of the at least one analog signal processing component, the method comprising:
   determining, in a digital signal processing domain downstream of the IF mixer, a metric which is affected by a frequency-dependency of an imbalance between the I signal and the Q signal (IQ-imbalance) over a signal bandwidth;
   generating, based on the metric thus determined, a calibration signal configured to at least partially compensate a frequency-dependency of the IQ-imbalance;
   feeding the calibration signal upstream of the IF mixer to the at least one analog signal processing component so as to calibrate the at least one analog signal processing component.

2. The method of claim 1, wherein the calibration signal is configured to reduce a frequency dependency of one or both of a gain imbalance and a phase imbalance between the I signal and the Q signal upstream of the IF mixer over the signal bandwidth.

3. The method of claim 1, wherein the calibration signal affects a frequency transfer function of the at least one analog signal processing component.

4. The method of claim 1, further comprising calibrating the IF mixer so as to at least partially compensate at least one of a gain imbalance and a phase imbalance between the I signal and the Q signal.

5. The method of claim 4, further comprising:
determining a compensation performance of the IF mixer;
selectively calibrating the at least one analog signal processing component based on the compensation performance.

6. The method of claim 5, further comprising:
determining a compensation performance of the at least one analog processing signal component;
selectively calibrating the IF mixer based on the compensation performance of the at least one analog processing signal component.

7. The method of claim 5, wherein the compensation performance is determined in terms of a metric which is related to an image-rejection ratio.

8. The method of claim 4:
wherein the calibration signal is configured to update one or more parameters of the at least one analog signal processing component;
further comprising determining IF mixer settings for compensating at least one of the gain imbalance and the phase imbalance responsive to the parameter update.

9. The method of claim 1, further comprising:
determining that a compensation performance criterion cannot be met;
requesting a signal bandwidth reduction responsive to the determination that a compensation performance criterion cannot be met.

10. The method of claim 1, wherein the calibration signal is generated using a calibration algorithm that is based on one or both of an estimated signal-to-noise ratio in an IQ-diagram and a power of the received signal as metric.

11. The method of claim 1, wherein the at least one analog signal processing component is selected from the set of signal processing components comprising at least one radio frequency mixer and at least one IF filter.

12. The method of claim 11:
wherein the analog signal processing components comprise a first IF filter for the I signal and a second IF filter for the Q signal;
wherein the calibration signal is fed to only one of the first IF filter and the second IF filter.

13. The method of claim 11, wherein the signal bandwidth is determined by a passband of the at least one IF filter.

14. A computer program product stored in a non-transitory computer readable medium for controlling a computing device to aid in calibrating an associated receiver apparatus comprising at least one analog signal processing component and an intermediate frequency (IF) mixer for converting IF signals comprising an in-phase (I) signal and a quadrature-phase (Q) signal to baseband frequency signals, wherein the IF mixer is arranged downstream of the at least one analog signal processing component, the computer program product comprising software instructions which, when run on one or more processing circuits of the computing device apparatus, causes the computing device to:
determine, in a digital signal processing domain downstream of the IF mixer, a metric which is affected by a frequency-dependency of an imbalance between the I signal and the Q signal (IQ-imbalance) over a signal bandwidth;
generate, based on the metric thus determined, a calibration signal configured to at least partially compensate a frequency-dependency of the IQ-imbalance;
feed the calibration signal upstream of the IF mixer to the at least one analog signal processing component so as to calibrate the at least one analog signal processing component.

15. A device for calibrating a receiver apparatus comprising at least one analog signal processing component and an intermediate frequency (IF) mixer for converting IF signals comprising an in-phase (I) signal and a quadrature-phase (Q) signal to baseband frequency signals, wherein the IF mixer is arranged downstream of the at least one analog signal processing component, the device comprising:
memory;
one or more processing circuits operatively connected to the memory and configured to:
determine, in a digital signal processing domain downstream of the IF mixer, a metric which is affected by a frequency-dependency of an imbalance between the I signal and the Q signal (IQ-imbalance) over a signal bandwidth;
generate, based on the metric thus determined, a calibration signal configured to at least partially compensate the frequency-dependency of the IQ-imbalance;
feed the calibration signal upstream of the IF mixer to the at least one analog signal processing component so as to calibrate the at least one analog signal processing component.

16. A receiver, comprising:
at least one analog signal processing component;
an intermediate frequency (IF) mixer for converting IF signals comprising an in-phase (I) signal and a quadrature-phase (Q) signal to baseband frequency signals, wherein the IF mixer is arranged downstream of the at least one analog signal processing component;
one or more processing circuits operatively connected to at least one analog signal processing component and configured to:
determine, in a digital signal processing domain downstream of the IF mixer, a metric which is affected by a frequency-dependency of an imbalance between the I signal and the Q signal (IQ-imbalance) over a signal bandwidth;
generate, based on the metric thus determined, a calibration signal configured to at least partially compensate the frequency-dependency of the IQ-imbalance;
feed the calibration signal upstream of the IF mixer to the at least one analog signal processing component so as to calibrate the at least one analog signal processing component.

17. The receiver of claim 16, wherein the at least one signal processing component has a frequency transfer function that is affectable by the calibration signal.

18. The receiver of claim 16, wherein the at least one analog signal processing component is selected from the set of signal processing components comprising at least one radio frequency mixer and at least one IF filter.

* * * * *

UNITED STATES PATENT AND TRADEMARK OFFICE
CERTIFICATE OF CORRECTION

PATENT NO.         : 9,264,156 B2
APPLICATION NO.    : 14/394531
DATED              : February 16, 2016
INVENTOR(S)        : Wilhelmsson et al.

It is certified that error appears in the above-identified patent and that said Letters Patent is hereby corrected as shown below:

In the Specification

In Column 7, Line 41, delete "$\alpha_f$" and insert -- $\alpha_1$ --, therefor.

In Column 8, Line 26, delete "$(\overline{\omega}_1 - \overline{W}_2).$" and insert -- $(\varpi_1 - \varpi_2).$ --, therefor.

Signed and Sealed this
Sixteenth Day of August, 2016

Michelle K. Lee
*Director of the United States Patent and Trademark Office*